United States Patent
Xu

(10) Patent No.: US 11,983,193 B2
(45) Date of Patent: May 14, 2024

(54) DATA PROCESSING METHOD, PLATFORM, COMPUTER-READABLE STORAGE MEDIUM AND ELECTRONIC DEVICE

(71) Applicant: BOE TECHNOLOGY GROUP CO., LTD., Beijing (CN)

(72) Inventor: Lei Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 177 days.

(21) Appl. No.: 17/614,418

(22) PCT Filed: Dec. 25, 2020

(86) PCT No.: PCT/CN2020/139301
§ 371 (c)(1),
(2) Date: Nov. 26, 2021

(87) PCT Pub. No.: WO2022/133981
PCT Pub. Date: Jun. 30, 2022

(65) Prior Publication Data
US 2022/0398254 A1    Dec. 15, 2022

(51) Int. Cl.
*G06F 16/26* (2019.01)
*G06F 16/22* (2019.01)
*G06F 16/25* (2019.01)

(52) U.S. Cl.
CPC ............ *G06F 16/26* (2019.01); *G06F 16/221* (2019.01); *G06F 16/258* (2019.01)

(58) Field of Classification Search
CPC ...... G06F 16/221; G06F 16/26; G06F 16/258; G06F 16/1794
See application file for complete search history.

(56) References Cited

U.S. PATENT DOCUMENTS

| | | | |
|---|---|---|---|
| 9,965,531 B2 | 5/2018 | O'Kane | |
| 11,222,004 B2* | 1/2022 | Mecozzi | G06F 16/21 |
| 2017/0024446 A1* | 1/2017 | O'Kane | G06F 16/2282 |

(Continued)

FOREIGN PATENT DOCUMENTS

| | | |
|---|---|---|
| CN | 104111996 A | 10/2014 |
| CN | 104820670 A | 8/2015 |

(Continued)

OTHER PUBLICATIONS

Written Opinion for PCT Patent Application No. PCT/CN2020/139301 dated Sep. 27, 2021.

*Primary Examiner* — Apu M Mofiz
*Assistant Examiner* — J Mitchell Curran
(74) *Attorney, Agent, or Firm* — Perilla Knox & Hildebrandt LLP; Kenneth A. Knox

(57) ABSTRACT

A data processing method, platform, and an electronic device are disclosed. The method includes: extracting original data into a message engine based on a preset standardized data interface, the original data including terminal data and system data generated by an application system. The method further includes: reading the original data from the message engine; storing the original data in a distributed file system to form a fact table; storing the fact table in a columnar database; obtaining target column data required for generating a target chart from the columnar database; and generating the target chart according to the target column data.

17 Claims, 7 Drawing Sheets

(56) References Cited

U.S. PATENT DOCUMENTS

| | | | |
|---|---|---|---|
| 2017/0154086 A1* | 6/2017 | Meier-Magruder | ........................ G06F 16/252 |
| 2018/0314746 A1* | 11/2018 | Gujarathi | ............ G06F 16/9566 |
| 2021/0117437 A1* | 4/2021 | Gibson | ................. G06F 16/258 |
| 2022/0156260 A1* | 5/2022 | Edara | .................. G06F 12/0875 |
| 2022/0229841 A1* | 7/2022 | Kharidehal | ......... G06Q 10/0633 |

FOREIGN PATENT DOCUMENTS

| | | |
|---|---|---|
| CN | 104933112 A | 9/2015 |
| CN | 104820670 B | 11/2018 |
| CN | 104933112 B | 12/2018 |
| CN | 111008197 A | 4/2020 |
| CN | 111143465 A | 5/2020 |
| CN | 111506660 A | 8/2020 |
| EP | 3121738 A1 | 1/2017 |

\* cited by examiner

| serial number 701 | topic domain 702 | index name 703 | meaning of index 704 | realized chart type 705 | creator 706 |
|---|---|---|---|---|---|
| 1 | terminal domain | basic terminal information | including used capacity, total running time, media volume, resolution, touch type, system version, and so on | table + filter box | Xi |
| 2 | terminal domain | device daily activity and online rate | last 7 days for the device | bar chart + line chart | Xi |
| 3 | user domain | number of registered organisations | cumulative number of registered organisations (statistical first-level organisations) | text | Xi |

FIG. 7

| data source | database | table name | field name | field type | whether the type is nullable | comment |
|---|---|---|---|---|---|---|
| Xinfa | screenosserver | device | create_time | timestamp | YES | create time |
| Xinfa | screenosserver | device | media_volume | int(10) | YES | media volume |
| Xinfa | screenosserver | device | run_time | varchar(255) | YES | run time of device |

DATA PROCESSING METHOD, PLATFORM, COMPUTER-READABLE STORAGE MEDIUM AND ELECTRONIC DEVICE

CROSS-REFERENCE TO RELATED APPLICATION

This application is a national phase application under 35 U.S.C. § 371 of International Application No. PCT/CN2020/139301, filed on Dec. 25, 2020, the disclosure of which is incorporated by reference in its entirety herein.

TECHNICAL FIELD

The present disclosure relates to the big data processing technology field and, in particular, relates to a data processing method, a data processing platform, a non-transitory computer-readable storage medium, and an electronic device.

BACKGROUND

The advent of the era of big data has significantly changed people's daily life and routine production. Relying on the various conveniences of the big data era, business processing of traditional industries have realized intelligence and high efficiency.

At present, data management methods adopted by enterprises include separate management using multiple independent systems, for example, an application system management system that manages various application systems, and a device management system that manages terminal devices, and so on.

However, because terminal information and system information exist independently, interconnection and intercommunication of information cannot be achieved, which makes it impossible to analyze the operation state of terminals and systems based on the terminal information and system information at the same time, or the operation state of the terminals can be analyzed based on only on the terminal information, and the operation state of the systems can be analyzed based only on the system information, which results in low accuracy of analysis results.

SUMMARY

According to an aspect of the present disclosure, there is provided a data processing method, including:
  extracting original data into a message engine based on a preset standardized data interface, wherein the original data includes terminal data generated by a terminal device and/or system data generated by an application system;
  reading the original data from the message engine, and storing the original data in a distributed file system to form a fact table;
  storing the fact table in a columnar database, and obtaining target column data required for generating a target chart from the columnar database; and
  generating the target chart according to the target column data.

According to an exemplary embodiment of the present disclosure, extracting the original data into the message engine based on the preset standardized data interface includes:
  based on the preset standardized data interface, receiving the terminal data pushed by a platform where the terminal device is located, wherein the terminal data includes one or more of device state behavior of the terminal device, command log data, and hardware product data; and
  based on a batch integration tool and the preset standardized data interface, pulling the system data from a relational database at an interval of a first preset time period; and
  aggregating the terminal data and/or the system data into the message engine.

According to an exemplary embodiment of the present disclosure, aggregating the terminal data and/or the system data into the message engine includes:
  according to a data event type of the system data and/or the terminal data, aggregating the terminal data and/or the system data under a topic in the message engine which corresponds to the data event type.

According to an exemplary embodiment of the present disclosure, the fact table includes a transaction fact table;
  wherein reading the original data from the message engine, and storing the original data in the distributed file system to form the fact table includes:
  reading the original data from the message engine, and according to a data generation timestamp of the original data, storing the original data in the distributed file system under a date corresponding to the data generation timestamp;
  reading the original data from the distributed file system, and constructing an original data layer according to the original data;
  calculating a topic domain of the original data according to the original data included in the original data layer and a data dictionary corresponding to the original data; and
  summarizing the original data according to the topic domain to generate the transaction fact table.

According to an exemplary embodiment of the present disclosure, reading the original data from the distributed file system, and constructing the original data layer according to the original data includes:
  creating an original data table including a data source, a data reporter, a data version number, a data sending location, a data generation timestamp, a data event type, and data details;
  reading the original data according to a storage location of the original data in the distributed file system; and
  according to a current date corresponding to the data generation timestamp of the original data, writing the original data into the original data table at a location corresponding to the current date to obtain the original data layer.

According to an exemplary embodiment of the present disclosure, calculating the topic domain of the original data according to the original data included in the original data layer and the data dictionary corresponding to the original data includes:
  obtaining the data dictionary corresponding to the original data, and determining a data business corresponding to the original data according to the data dictionary; and
  determining the topic domain of the original data according to the data business, wherein the topic domain includes one or more of a terminal domain, a system domain, and a user domain.

According to an exemplary embodiment of the present disclosure, obtaining the data dictionary corresponding to the original data includes:
- when the original data is the system data, pulling metadata corresponding to the original data as the data dictionary; and
- when the original data is the terminal data, creating the data dictionary according to a catalog included in the metadata.

According to an exemplary embodiment of the present disclosure, summarizing the original data according to the topic domain to generate the transaction fact table includes:
- when the original data is the terminal data, summarizing the original data into a report whose topic domain is the terminal domain, and generating the transaction fact table corresponding to the terminal domain; and
- when the original data is the system data, summarizing the original data into a report whose topic domain is the system domain, and generating the transaction fact table corresponding to the system domain.

According to an exemplary embodiment of the present disclosure, the fact table further includes a periodic snapshot fact table;
- wherein the data processing method further includes:
- aggregating the transaction fact table based on a preset aggregation rule to obtain the periodic snapshot fact table;
- wherein the preset aggregation rule includes aggregation at a preset time interval.

According to an exemplary embodiment of the present disclosure, aggregating the transaction fact table based on the preset aggregation rule to obtain the periodic snapshot fact table includes:
- generating an attribute dimension table according to attribute information of the terminal device included in the terminal data and attribute information of the application system included in the system data;
- establishing an association relationship between a transaction fact table corresponding to the terminal domain and a transaction fact table corresponding to the system domain according to common attributes between the terminal device and the application system included in the attribute dimension table; and
- based on the association relationship, aggregating the transaction fact table corresponding to the terminal domain and the transaction fact table corresponding to the system domain at the preset time interval to obtain the periodic snapshot fact table.

According to another aspect of the present disclosure, there is provided a data processing platform, including:
- a data aggregation layer configured to extract original data to a message engine based on a preset standardized data interface;
- a data storage layer connected to the data aggregation layer and configured to read the original data from the message engine and store the original data in a distributed file system;
- a data processing layer connected to the data storage layer and configured to:
- read the original data from the distributed file system, and generate a fact table based on the original data; and
- store the fact table in a columnar database, and obtain target column data required for generating a target chart from the columnar database; and
- generate the target chart according to the target column data.

According to an exemplary embodiment of the present disclosure, the data processing layer includes an original data layer, a unified data warehouse layer, an application data layer, a tag data layer, and a dimension table;
- wherein the unified data warehouse layer is connected to the original data layer, the application data layer and the tag data layer are connected to the unified data warehouse layer, and the dimension table is included in the unified data warehouse layer;
- wherein the original data layer is configured to read the original data from a file storage system and store the original data;
- wherein the unified data warehouse layer is configured to:
- calculate a topic domain of the original data according to the original data included in the original data layer and a data dictionary corresponding to the original data; and
- summarize the original data according to the topic domain to generate a transaction fact table; and
- generate an attribute dimension table according to attribute information of terminal device included in terminal data included in the original data and attribute information of an application system included in system data included in the original data;
- generate a periodic snapshot fact table according to the transaction fact table and the attribute dimension table;
- wherein the application data layer is configured to obtain target column data required for generating a target chart from the column database, and generate the target chart according to the target column data;
- wherein the tag data layer is configured to identify the terminal device and the application system included in the original data.

According to another aspect of the present disclosure, there is provided a computer-readable storage medium having a computer program stored thereon, wherein when the computer program is executed by a processor, the processor is caused to perform the data processing method according to any one of the above embodiments.

According to another aspect of the present disclosure, there is provided an electronic device, including:
- a processor; and
- a memory for storing instructions executable by the processor;
- wherein the processor is configured to execute the executable instructions to perform the data processing method according to any one of the above embodiments.

It should be understood that the above general description and the following detailed description are only exemplary and explanatory, and should not be considered as constituting any limitations on the present disclosure.

BRIEF DESCRIPTION OF THE DRAWINGS

The drawings, which are incorporated into the specification and constitute a part of the specification, show embodiments in accordance with the disclosure, and are used to explain the principles of the disclosure together with the specification. Obviously, the drawings in the following description are only some embodiments of the present disclosure. For those of ordinary skill in the art, other drawings can be obtained based on these drawings without creative work.

FIG. 7 is a schematic diagram showing an example of a topic domain according to an exemplary embodiment of the present disclosure.

FIG. 8 is a schematic diagram showing an example of a data dictionary according to an exemplary embodiment of the present disclosure.

DETAILED DESCRIPTION

Figure 1:
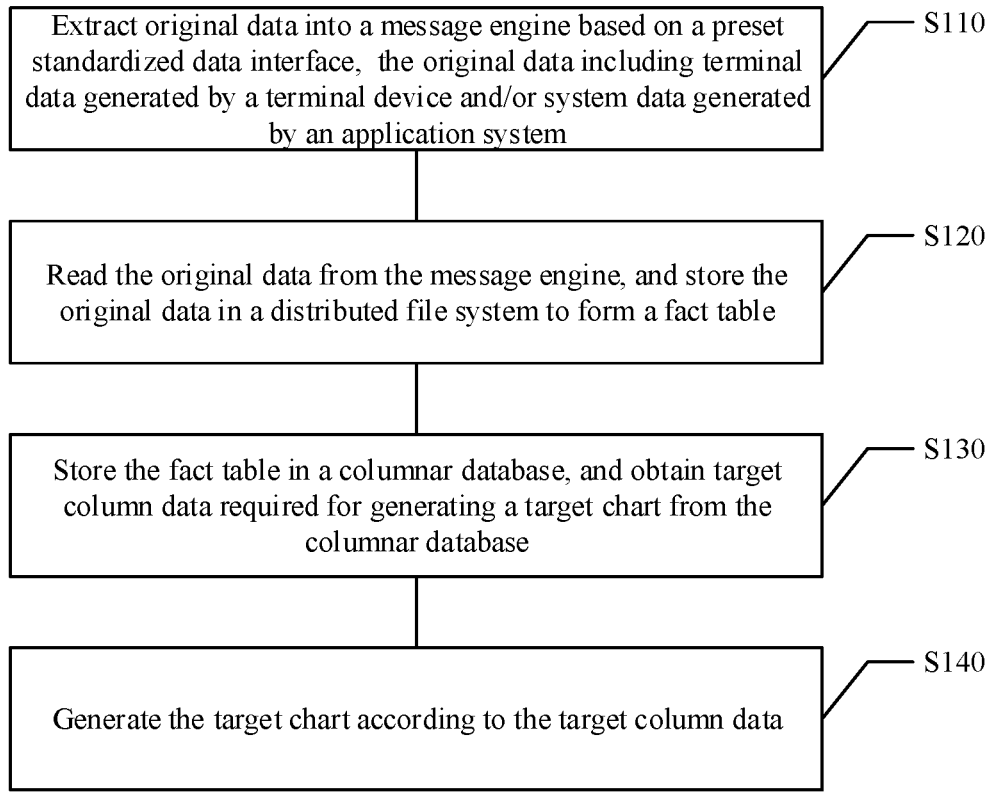
FIG. 1 schematically shows a flowchart of a data processing method according to an exemplary embodiment of the present disclosure.

Example embodiments will now be described more fully with reference to the accompanying drawings. However, the embodiments can be implemented in a variety of forms and should not be construed as being limited to the examples set forth herein; rather, these embodiments are provided so that the present disclosure will be more complete so as to convey the idea of the exemplary embodiments to those skilled in this art. The same reference signs in the drawings indicate the same or similar structures, and thus their repeated descriptions will be omitted. In addition, the drawings are only schematic illustrations of embodiments of the present disclosure, and are not necessarily drawn to scale.

In addition, the drawings are only schematic illustrations of the present disclosure, and are not necessarily drawn to scale. The same reference numerals in the figures denote the same or similar parts, and thus their repeated description will be omitted. Some of the block diagrams shown in the drawings are functional entities and do not necessarily correspond to physically or logically independent entities. These functional entities may be implemented in the form of software, or implemented in one or more hardware modules or integrated circuits, or implemented in different networks and/or processor devices and/or microcontroller devices.

An exemplary embodiment first provides a data processing method, which can run on a server, a server cluster, or a cloud server where a data center is located. Of course, those skilled in the art can also run the method in embodiments of the present disclosure on other platforms as required, and embodiments of the present disclosure do not impose specific limitations on this. Referring to FIG. 1, the data processing method may include the following steps:

In step S110, original data is extracted into a message engine based on a preset standardized data interface. The original data includes terminal data generated by a terminal device and/or system data generated by an application system.

In step S120, the original data is read from the message engine, and the original data is stored in a distributed file system to form a fact table.

In step S130, the fact table is stored in a columnar database, and target column data required for generating a target chart is obtained from the columnar database.

In step S140, the target chart is generated according to the target column data.

In the above data processing method, on the one hand, the original data is extracted into the message engine based on a preset standardized data interface; then, the original data is read from the message engine, and the original data is stored in the distribution In the format file system to form a fact table; then, the fact table is stored in the columnar database, and the target column data required for generating the target chart is obtained from the column database; finally, the target chart is generated according to the target column data. Because the system data and terminal data can be extracted into the message engine at the same time to generate the target chart, the embodiment of the present disclosure can solve the problem in related arts that it is impossible to analyze the operation state of terminals and systems based on the terminal information and system information at the same time since terminal information and system information exist independently and interconnection and intercommunication of information cannot be achieved. On the other hand, the target column data required for generating the target chart is obtained from the columnar database, and the target chart is generated according to the target column data, and thus the operation states of the terminal device and the application system can be analyzed according to the target chart. This avoids the problem of low accuracy of analysis results caused by analysis of the operation state of the terminal based only on the terminal information and analysis of the operation state of the system based only on the system information. Further, the original data is extracted into the message engine based on the preset standardized data interface. This can avoid the problem of inability to process data or incorrect processing results due to inconsistent current data standards, and further improves the accuracy of the processing results.

Hereinafter, steps in the data processing method according to embodiments of the present disclosure will be explained and described in detail with reference to the accompanying drawings.

First, terms involved in the present disclosure will be explained and described.

The standardized data interface is an interface that can support data collection for software (application system) and hardware (terminal device). The application system can, for example, be a Web terminal system and application software, etc. The hardware can be an interactive terminal such as a tablet which can be operated by touch, a painted screen, or a writing board, etc., or the hardware can be a non-interactive terminal such as a television, or an information distribution terminal, etc. Also, the hardware may support collection of offline data sources and real-time data streams. The offline data sources may be for example, a relational database MySQL and PostgreSQL used by business products, and so on. The real-time data streams may be for example an IoT (Internet of Things) platform using terminal event tracking data, or real-time system event tracking data, and so on.

HDFS (Hadoop Distributed File System) is a highly fault-tolerant system, and is suitable for deployment on a cheap machine. Thus, HDFS is very suitable for persistent storage of large data sets. HDFS can also provide high-throughput data access, and is very suitable for applications on large data sets.

Data assets are data resources that are physically or electronically recorded, such as documents, electronic data, etc., which are owned or controlled by an enterprise and can bring future economic benefits to the enterprise. The characteristics of a data asset can include covering the entire domain of data, clear hierarchical structure, accurate and consistent data, performance improvement, cost reduction, and ease of use. Data assets are the core product of the data center. If the data of all products on various business lines in the enterprise is connected, the data only needs to be processed once and then the data can be reused and shared. Accordingly, the original chimney-style development and storage of each business can be abandoned, reducing development costs and manpower and material resources.

Webhook, which is an API concept, is one of the usage paradigms of microservice APIs. That is, the front-end does not actively send messages, messages are completely pushed by the back-end. That is, when data is generated for event tracking of a terminal or a system, data is actively distributed and pushed to a receiving interface.

Kafka is a message engine, which can support a cluster mode. Kafka can provide a redundancy mechanism using multiple copies of the same backup to ensure high system availability. Data can be stored persistently (generally set to 7 days), meaning that data imported into Kafka within 7 days will not be deleted and is stored on the hard disk. The core architecture of Kafka is that producers send messages to Kafka, and consumers read messages from the Kafka server. The two most common message engine paradigms include: a message queue model and a publish/subscribe model, and Kafka supports both of the message engine models.

ClickHouse is a column-oriented Database Management System (DBMS) that can store values of individual columns separately, allow tables and databases to be created during running, data loading and running queries can be performed without the need to reconfigure and restart the server. Data compression is used to improve performance. ClickHouse supports storage of data using magnetic disks, and the amount of data that can be stored is increased. ClickHouse supports real-time data update, data can be continuously added to tables, and no processing is needed when adding data. The biggest advantages include fast query speed and large volume (PB level), supporting SQL-like queries, and also supporting database remote replication deployment. ClickHouse is very suitable for data source libraries supporting data service applications.

Real-time data includes, but is not limited to, a real-time data stream of the Internet of Things platform collected using a data collection manner by event tracking for the terminal and real-time data stream collected using a data collection manner by event tracking in software. The real-time data is distributed to the standardized data interface to realize the collection. The data receiving interface adopts a reverse application program interface, namely Webhook.

Offline data includes, but is not limited to, a certain amount of data accumulated after a period of time, and data stored in relational databases MySQL and PostgreSQL that are often used in business products can all be classified as offline data. Offline data can be updated in batches using batch pull tools, such as pulling the overall data in the database once a day, or pulling the overall data in the database at the hourly level. The batch pull tool can use the log collection tool flume or the open source stream processing framework Flink to pull offline data in batches.

Offline development refers to the use of batch computing. Offline computing is mainly used for high-latency processing scenarios of batch data, such as offline data warehouse processing, large-scale data cleaning and mining, etc., and computing frameworks such as MapReduce or Spark can be used.

Real-time development refers to the use of streaming computing. Streaming computing is suitable for scenarios where high timeliness requirements are imposed on processing and application of corresponding data. Common examples include monitoring and alarm scenarios, such as real-time analysis of network events. Computing frameworks which are widely applied mainly include Flink, Spark Streaming, Storm, etc.

The transaction fact table is used to record the facts at the transaction level. What is saved in the transaction fact table is atomic data. The granularity of data is usually one record per transaction. When the data in the transaction fact table is inserted, the data will not be changed. The update method is incremental update. Facts refer to the actual use facts of the application system and the terminal device, for example, the functions that the application system can support, the user information included in the application system, the actual attributes of the terminal device, the file format that the terminal device can support, or the online and offline status of the terminal device, and so on.

The aggregated fact table, also known as the periodic snapshot fact table, is a fact table formed by aggregating transaction facts, including a periodic snapshot fact table that records facts at regular and predictable time intervals. The periodic snapshot fact table produces snapshots at regular and predictable time intervals to record facts. Each row represents a record of a certain time period. The recorded facts are aggregated fact values or state of the measures in the time period. The contents of the periodic snapshot fact table are generally generated after the end of the expressed time period. Generally, the data will not change after recording. The update method is incremental update. The periodic snapshot fact table is generally based on the aggregation of the transaction fact table, the dimension of the periodic snapshot fact table is less than that of the transaction fact table, and the granularity of the periodic snapshot fact table is thicker than that of the transaction fact table.

Next, the objectives of the present disclosure will be explained and illustrated. Under traditional IT construction, most of the various information systems of enterprises are independently purchased or constructed independently, and the interconnection of information cannot be achieved, resulting in the formation of multiple data islands within the enterprises. The development of the Internet and mobile Internet has brought many new business models, and the generated data cannot be interoperable with the data under the traditional models, which further exacerbates the problem of data islands. Also, the data scattered on various islands cannot well support the business decision-making of enterprises, and cannot respond well to the rapidly changing business needs.

Therefore, enterprises need a set of mechanisms through which to integrate new and old models, integrate data scattered on various islands, quickly form data service capabilities, and provide support for business decision-making and refined operations. This set of mechanisms is the data center.

The data center performs collection, calculation, storage, and processing of massive data through data technologies, and unifies data standards and interfaces, and the data center is also responsible for required model services and algorithm services during establishment of the data center, the organization, process, standards and norms and management system for constructing the data center, and so on. After the data is unified, the data center forms standard data, and then store the standard data to form data assets, realize data service capabilities through data mining and analysis tools, and provide efficient services for enterprises and customers.

In the following, the data processing platform of the present disclosure (that is, the data center mentioned above) will be explained.

Figure 2:
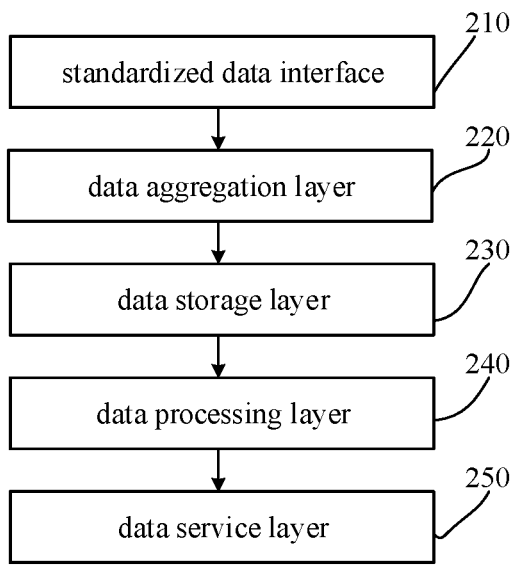
FIG. 2 schematically shows a structural block diagram of a data processing platform according to an exemplary embodiment of the present disclosure.

Specifically, referring to FIG. 2, the data processing platform may include a standardized data interface 210, a data aggregation layer 220, a data storage layer 230, and a data processing layer 240. Also, the data processing may include a data service layer 250.

The data aggregation layer 220 is connected to the standardized data interface 210, and may be configured to extract original data to a message engine based on the preset standardized data interface. The data storage layer 230 is connected to the data aggregation layer and configured to read the original data from the message engine and store the original data in a distributed file system. The data processing layer 240 is connected to the data storage layer and configured to: read the original data from the distributed file system, and generate a fact table based on the original data; and store the fact table in a columnar database, and obtain target column data required for generating a target chart from the columnar database; and generate the target chart according to the target column data. The data service layer 250 is connected to the data processing layer and configured to analyze the operation status of the terminal devices and the application system included in the target chart according to the target chart.

Figure 3:
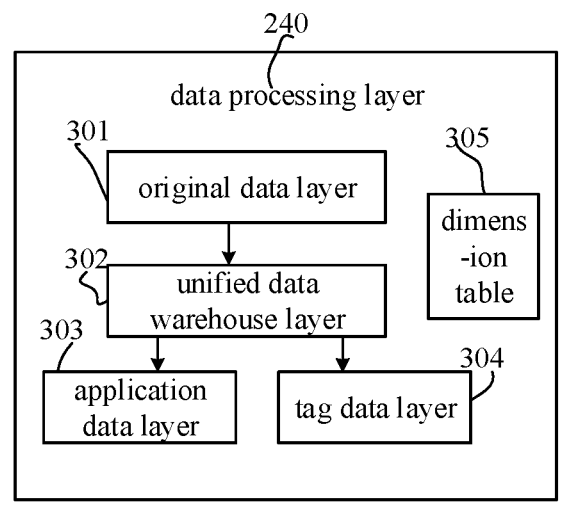
FIG. 3 schematically shows a structural block diagram of a data processing layer according to an exemplary embodiment of the present disclosure.

Further, referring to FIG. 3, the data processing layer 240 may include an original data layer (Operational Data Store, ODS) 301, a unified data warehouse layer (Data Warehouse Detail/Data Warehouse service, DWD/DWS) 302, an application data layer (Application Data Store, ADS) 303, a tag data layer (Tag Data Model, TDM) 304, and a dimension table (Dim data, DIM) 305. The unified data warehouse layer is connected to the original data layer, and the application data layer and the tag data layer are connected to the unified data warehouse layer, and the dimension table is included in the unified data warehouse layer. That is, the data of the DWD/DWS data layer comes generally from the ODS layer, and the data of the TDM/ADS data layer comes from the DWD/DWS data layer. According to actual situations, data assets can be composed of all or part of the data layers.

The unified data warehouse layer is configured to: calculate a topic domain of the original data according to the original data included in the original data layer and a data dictionary corresponding to the original data; and summarize the original data according to the topic domain to generate a transaction fact table; and generate an attribute dimension table according to attribute information of terminal device included in terminal data included in the original data and attribute information of an application system included in system data included in the original data; generate a periodic snapshot fact table according to the transaction fact table and the attribute dimension table. The application data layer is configured to obtain target column data required for generating a target chart from the column database, and generate the target chart according to the target column data. The tag data layer is configured to identify the terminal device and the application system included in the original data.

In the following, the method of constructing the above-mentioned data center will be described. Specifically, the method for constructing the data center mainly includes five processes: data collection step, data aggregation step, data storage step, data development step, and data analysis step.

Data collection is realized by using a universal data receiving interface (standardized data interface) service. The data source includes real-time data and offline data on various terminal devices and application systems. Data aggregation is realized by a message engine, which can achieve the purpose of traffic peak reduction and play the role of data transmission channel. Data storage realizes the persistent storage of real-time data and offline data, which can satisfy historical data back calculation or supplement of data. Data development includes batch computing and streaming computing. The batch computing is suitable for high-latency processing scenarios for batch data. The streaming computing is s suitable for scenarios where high timeliness requirements are imposed on processing and application of corresponding data. Data analysis realizes data value mining based on data assets, and reversely empowers business. Through data modeling, a global labeling system for data objects is formed, and data applied to the business is provided.

Hereinafter, step S110 to step S140 will be explained and described with reference to the above-mentioned data center.

In step S110, original data is extracted into a message engine based on a preset standardized data interface. The original data includes terminal data generated by a terminal device and/or system data generated by an application system.

Figure 4:
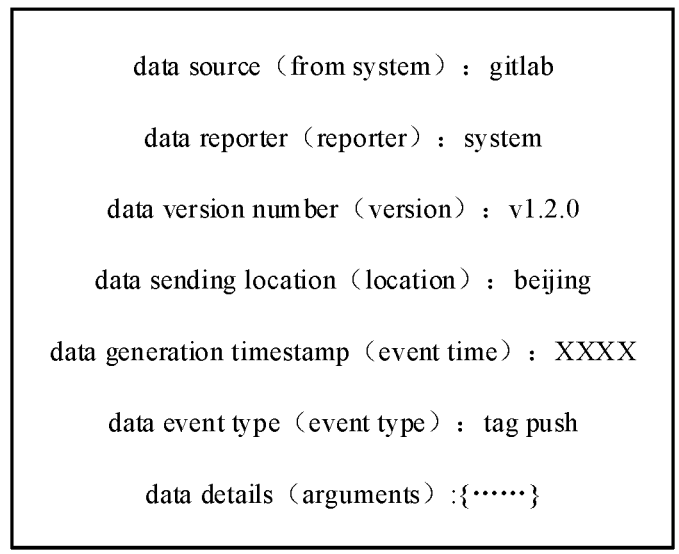
FIG. 4 schematically shows an exemplary diagram of a standard data format according to an exemplary embodiment of the present disclosure.

In an exemplary embodiment, referring to FIG. 4, the attribute information included in the standardized data interface may include a data source (from system), a data reporter (reporter), a data version number (version), a data sending location (location), a data generation timestamp (event time), a data event type (event type) and data details (arguments). The data details can include a project name, a first event parameter corresponding to the project name, a project note, a second event parameter corresponding to the project note, a project address, a third event parameter corresponding to the project address, the number of added files, a fourth event parameter corresponding to the number of added files, a submission note, and a fifth event parameter corresponding to the submission note, and so on. As an example, the project name is EPD_Transform (the first event parameter as an example), the corresponding second event parameter is EPD smart filter, and the third event parameter is: git@*****: abid/image_process_group/EPD_transform.git, the fourth event parameter is 3, and the fifth event parameter is fixing the slow bug of response time. What needs to be added here is that the standardized data receiving interface is a universal interface, and by this universal interface, real-time data streams collected from various resources can be multiplexed. The universal data receiving interface first needs to define a universal standard data format, which can be in the json format or xml format, but is not limited to the two formats.

Specifically, extracting the original data into the message engine based on the preset standardized data interface may include: first, based on the preset standardized data interface, receiving the terminal data pushed by a platform where the terminal device is located, wherein the terminal data includes one or more of device state behavior of the terminal device, command log data, and hardware product data; and then, based on a batch integration tool and the preset standardized data interface, pulling the system data from a relational database at an interval of a first preset time period; and finally, aggregating the terminal data and/or the system data into the message engine.

The device state behavior represents the online state and offline state of the device. The command log data may include commands received by the terminal device (such as switch commands or play commands, etc.). The hardware product data may include the attribute information of the terminal device, such as resolution supported by the terminal device and device size, etc. Each hardware product data can be collected by a sensor, or a camera, and so on. For example, when the data is collected using a sensor, a reliable transmission and low-latency Message Queuing Telemetry Transport (MQTT) protocol may be used to build the framework of the Internet of Things to realize the data communication between the device side and the server side. The built cluster can support a large number of connected terminals. The device state behavior and command log data of the terminals can be actively collected, and based on this, terminal data can be obtained.

Further, since each application system interacts with users every day to generate a large amount of data, the data can be collected by event tracking technologies to achieve real-time data collection. And, each application system has a part of data stored in a database through a back-end interface to form offline data.

Further, after receiving the terminal data and system data through the standardized data interface, the obtained original data is processed as standardized data which includes a data source, a data reporter, a data version number, a data sending location, a data generation timestamp, a data event type, and data details. Moreover, after receiving the terminal data and/or pulling the system data, the terminal data and/or the system data can be aggregated into the message engine. Specifically, the following steps may be included. According to the data event type of the terminal data and/or the system data, the terminal data and/or the system data is aggregated under a topic in the message engine which corresponds to the data event type.

The message engine can play the role of traffic peak reduction, and also play the role of message queue and message publishing and subscription. The message engine can temporarily store data, and the message engine can be implemented by Kafka. Further, the real-time data stream collected through the universal data receiving interface (standardized data interface) is transferred to the message engine, and the data from the offline data source obtained through batch pull is also transferred to the message engine. The universal data receiving interface and the batch pull tool are equivalent to Kafka's message producers, which continuously transmit the collected data, real-time data, or the overall offline data pulled in batches to specified topics. Moreover, the topic in Kafka is just a logical concept, representing a type of message, which can be considered as the place where the message is sent. The producers transfer data to Kafka. Each producer needs to specify a topic to which messages are sent. The same topic can be subscribed by multiple consumers.

For example, the product terminals of enterprises adopt the Internet of Things platform to collect real-time data streams in real time, such as event tracking data, log records, command results, message status and so on. The data collected by the Internet of Things platform can be distributed to the universal data receiving interface, and then is transferred to the specified topic in Kafka to realize the aggregation of real-time data streams, and then Kafka is used to store the source data in the file storage system of the big data platform under a specified catalog. The file storage system is the distributed file system of Hadoop.

In step S120, the original data is read from the message engine, and the original data is stored in a distributed file system to form a fact table.

Figure 5:
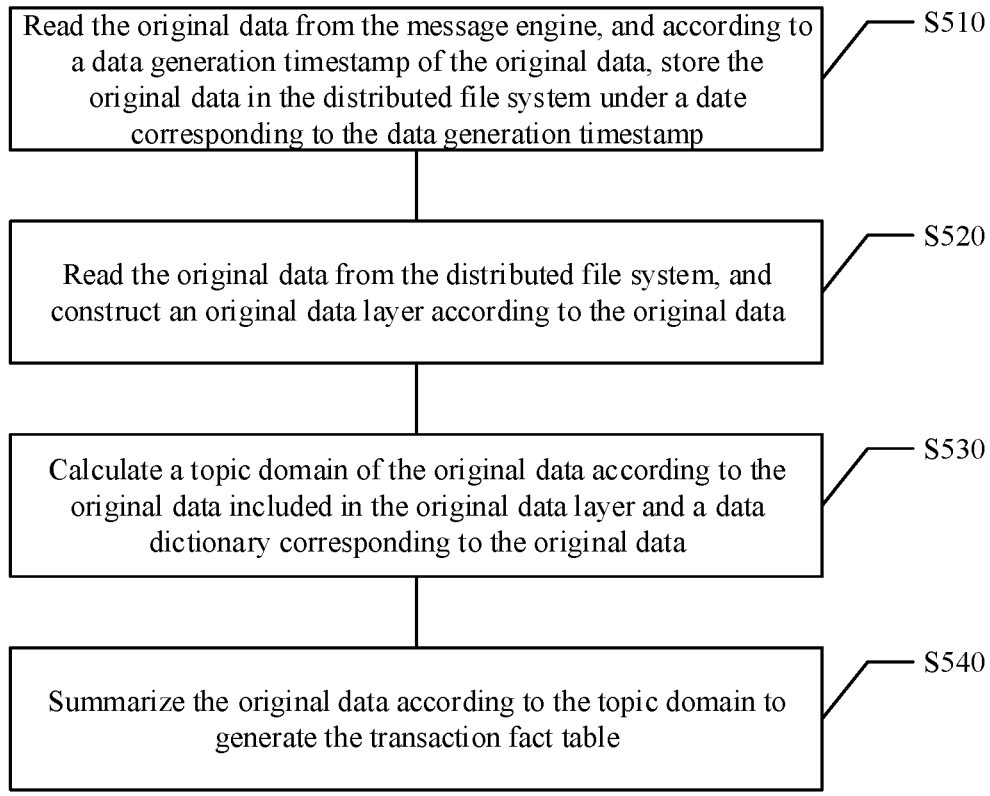
FIG. 5 schematically shows a flowchart of a method for reading original data from a message engine and storing the original data in a distributed file system to form a fact table according to an exemplary embodiment of the present disclosure.

In an exemplary embodiment, referring to FIG. 5, the original data is read from the message engine and the original data is stored in a distributed file system. The step of forming the fact table may include steps S510 to S540.

In step S510, the original data is read from the message engine, and according to a data generation timestamp of the original data, the original data is stored in the distributed file system under a date corresponding to the data generation timestamp.

Specifically, data persistent storage can be implemented using the Hadoop distributed file system HDFS of the big data platform. Further, the Kafka topic consumer function is used to read the original data in the message engine Kafka and the data is stored on HDFS. Moreover, no matter whether the system data or terminal data is collected and transferred to Kafka, there will be a corresponding topic. When reading data, a consumer is created for each topic, and the source data in a topic is stored in the HDFS in the big data cluster under a corresponding path directory to realize the persistent storage of original data. The path directory includes the date.

Further, since the original data is extracted through a standardized data interface, the data has a unified data format. By this method, it is convenient to write subsequent offline development. Accordingly, no matter what the initial data format of each business is, after the data format is unified, one program can be used for processing, which reduces the workload and avoids the need for developers to know metadata of business data.

In step S520, the original data is read from the distributed file system, and an original data layer is constructed according to the original data.

Figure 6:
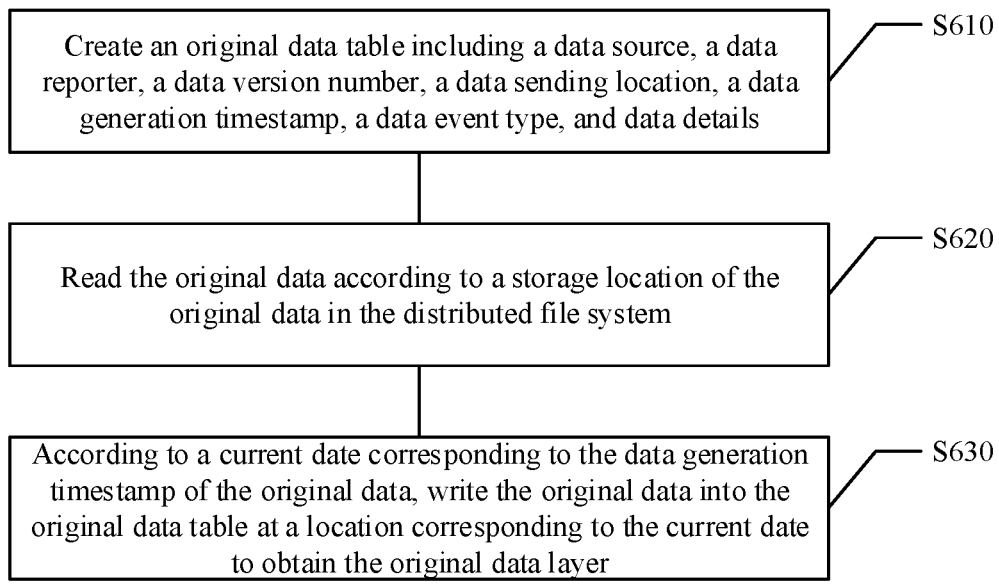
FIG. 6 schematically shows a flowchart of a method for reading original data from a distributed file system and constructing an original data layer according to the original data according to an exemplary embodiment of the present disclosure.

In an exemplary embodiment, referring to FIG. 6, the current data is read from the distributed file system and an original data layer is constructed according to the current data. Step S610 to step S630 may be included.

In step S610, an original data table including a data source, a data reporter, a data version number, a data sending location, a data occurrence timestamp, a data event type, and data details is created.

In step S620, the original data is read according to a storage location of the original data in the distributed file system.

In step S630, according to a current date corresponding to the data occurrence time stamp of the original data, the original data is written into the original data table at a location corresponding to the current date to obtain the original data layer.

Hereinafter, steps S610 to step S630 will be explained and described. Specifically, the construction of the data warehouse ODS layer can be implemented by the Hive component in the big data platform. First, it is needed to create the Hive table creation statement. The corresponding storage location is the storage location of the table in the corresponding source data under the corresponding business catalog on HDFS. For example, Table 1 is provided below.

TABLE 1 create external table if not exists xinfa_mysql.ods_xinfa_mysql_device(
id bigint comment 'primary key id',
name string comment 'device name',
mac string comment 'mac address',
uid bigint comment 'user id',
is_actived int comment 'whether to active, 1 for yes, and 0 for no',
is_online int comment 'whether online, 1 for yes, and 0 no',
latitude string comment 'latitude',
longitude string comment 'longitude',
.......
bdp_reporter string comment 'event reporter',
bdp_version string comment 'version'
)
comment 'device operation informaiton'
PARTITIONED BY (load_date string)
row format serde 'com.boe.cn.BoeJsonSerde'
stored as textfile
location '/hive/xinfa/xinfa_mysql.db/device';

What needs to be added here is that the method of constructing the data warehouse ODS layer for the system data and the terminal data is the same. After creating the Hive table creation statement, initialization is performed, that is, the partition of data in the earliest day is added to the Hive table, and then the partition is refreshed every day, that is, the partition of the previous day is added to the Hive table. In this case, the data on HDFS (Hadoop Distributed File System) will correspondingly enter the Hive table.

In step S530, the topic domain of the original data is calculated according to the original data included in the original data layer and a data dictionary corresponding to the original data.

In an exemplary embodiment, first, the data dictionary corresponding to the original data is obtained, and a data business corresponding to the original data is determined according to the data dictionary. Then, the topic domain of the original data is determined according to the data business, wherein the topic domain includes a terminal domain, a system domain, and a user domain and so on. The obtaining of the data dictionary corresponding to the original data c includes, when the original data is the system data, pulling metadata corresponding to the original data as the data dictionary; and when the original data is the terminal data, creating the data dictionary according to a catalog included in the metadata.

Specifically, the prerequisite for determining the report index of each business is to set the topic domain of the business first. The topic domain can include a first level topic domain, a second level topic domain, etc. The first level topic domain can be a terminal domain, a system domain, or a user domain, etc. The second level topic domain can be customized by data warehouse developers, for example, the DMA domain, sensor domain, log domain and so on under the terminal domain. Then, the index under each topic domain is specified. Taking the terminal domain as an example, referring to FIG. 7, the specific contents include a serial number (id) 701, a topic domain 702, an index name 703, an index meaning 704, a realized chart type 705, a creator 706, and so on. This process requires multiple communications with business related personnel, and after multiple iterations and updates, the final index version can be determined.

Further, for the data dictionary of the MySQL database of the system, pulling of the metadata of the My SQL database may be performed by Flink's docker image, and the data is stored in the PostgreSQL database of the big data platform. A zipper table is used to realize update, update may be performed once a day. Each field of each table in each database is a row of data in a PostgreSQL database table, including creation time and update time. If the information of this field (for example, field type/is_nullable/comment) changes, then a new piece of data for this field is created, the creation time and update time are both the current time when the Flink docker image pull is performed. The update time of the original data row of this field is the image pull time, and the life cycle of the original data row is up to the current point in time. An example is shown in the following table. Because multiple topics of the Internet of Things platform do not have metadata information stored in the system, it is needed to manually build a data dictionary. A corresponding data dictionary may be built based on the data dictionary directory of the MySQL database. For details, please refer to FIG. 8.

For example, in the data dictionary shown in FIG. 8, the corresponding directory may include: a data source (from_system) 801, a database 802, a table name (table_name) 803, a field name (column_name) 804, a field type (column_type)) 805, whether the type is nullable (is_nullable) 806, a comment 807 and so on. Taking an information distribution system as an example, the data source can be xinfa, the database can be screenosserver, the table name can be device, the field type can include create_time, media_volume, run_time, and so on, and the field type can include timestamp, int(10), varchar (255), and the comment can include creation time, media volume, and device running time, and so on.

In step S540, the original data is summarized according to the topic domain to generate the transaction fact table.

In an exemplary embodiment, it needs to be explained first that the process of summarizing the original data according to the topic domain and then generating the transaction fact table can be implemented by means of offline development and real-time development. For example, the batch computing in data development for the data center is suitable for calculation of the original data, and the calculation results (transaction fact tables) that can be used for data services are stored in the columnar database ClickHouse. And, the batch computing can use the Spark framework, and the intermediate data warehouse can use the hive tool. The streaming computing is suitable for using Flink real-time processing tool to directly perform data cleaning, aggregation, and other operations on the consumer data in Kafka.

Further, in an exemplary embodiment, first, the original data is summarized according to the topic domain to generate the transaction fact table. The following steps may be included: when the original data is the terminal data, summarizing the original data into a report whose topic domain is the terminal domain, and generating the transaction fact table corresponding to the terminal domain; and when the original data is the system data, summarizing the original data into a report whose topic domain is the system domain, and generating the transaction fact table corresponding to the system domain.

Furthermore, after the transaction fact table is obtained, the data processing method may further include aggregating the transaction fact table based on a preset aggregation rule to obtain the periodic snapshot fact table. The preset aggregation rule includes aggregation at a preset time interval.

Figure 9:
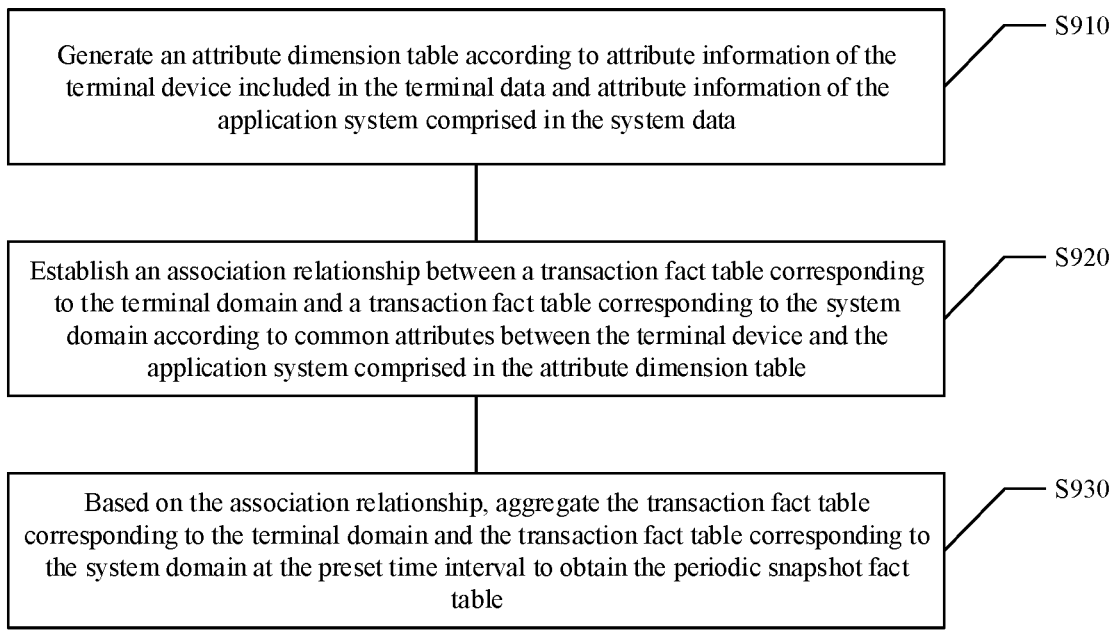
FIG. 9 schematically shows a flowchart of a method for aggregating a transaction fact table based on a preset aggregation rule to obtain a periodic snapshot fact table according to an exemplary embodiment of the present disclosure.

Further, referring to FIG. 9, aggregating the transaction fact table based on the preset aggregation rule to obtain the periodic snapshot fact table may include steps S910 to S930.

In S910, an attribute dimension table is generated according to attribute information of the terminal device included in the terminal data and attribute information of the application system included in the system data.

In S920, an association relationship between a transaction fact table corresponding to the terminal domain and a transaction fact table corresponding to the system domain is established according to common attributes between the terminal device and the application system included in the attribute dimension table.

In S930, based on the association relationship, the transaction fact table corresponding to the terminal domain and the transaction fact table corresponding to the system domain are aggregated at the preset time interval to obtain the periodic snapshot fact table.

Hereinafter, the specific implementations of S540 and steps S910 to S930 (that is, the specific construction process of the DWD/DWS layer) will be explained and described. Specifically, data meaning of the business may be known from the data dictionary of the business source database, and the DWD/DWS layer of the data warehouse can be constructed in combination with the determined report indexes. The DWD layer data warehouse adopts the data warehouse modeling method of dimensional modeling, which uses the current fact table and the dimension table to organize the data. That is, a large table of facts for each entity of the business is constructed, and a dimension table of entities (application systems and terminal devices) is constructed. Further, since the topic domain has been determined, when the current data is the terminal data, the data is directly summarized in the report whose topic domain is the terminal domain to generate a transaction fact table corresponding to the terminal domain; when the current data is the system data, the data is directly summarized into the report whose topic domain is the system domain to generate a transaction fact table corresponding to the system domain.

Further, in order to generate a periodic snapshot fact table, that is, in order to obtain the association relationship between the terminal data and the system data, it is also needed to generate a dimension table. Specifically, the attribute dimension table can be generated according to the attribute information of the terminal device included in the terminal data and the attribute information of the application system included in the system data. The attribute dimension table can include the user's access mac address, the user's login name (such as the user's mobile phone number or ID number), the user's login time and the attribute information of the application system itself (size, devices which the application system supports to install, and version or other inherent attributes), the mac address of the terminal device, and the online time and offline time of the terminal device, the specific playback content of the terminal device, the identification information of the user who purchased the terminal device (such as the user's mobile phone number or ID number), and the attribute information of the terminal device itself (inherent attributes such as size and resolution), and so on. When the dimension table is obtained, the relationship between the transaction fact table corresponding to the terminal domain and the transaction fact table corresponding to the system domain can be established based on the dimension table (for example, the user's mobile phone number or ID number). Finally, based on the association relationship, the periodic snapshot fact table is obtained to facilitate the analysis of the operation status of the terminal device and the application system.

In other words, in order to determine the common users of terminal device and application system, the Spark framework can be used to read and store user data from the source data of all business products (terminal device and application systems) into Hive to form the ODS data layer. Then, aggregation of transactions for all user data is performed. Then, the common users are determined through multiple dimensional attributes of the selected user to form the user topic domain DWD data layer. These attributes are used to determine the uniqueness of the user. The attributes can be the user's mobile phone number or identity. The DWD data layer is also stored in the hive data warehouse. Some aggregated indexes are made, for example, the total number of users of the product on a daily basis, the number of new users per day and so on, to form the DWS data layer. The ODS/DWD/DWS data layers jointly form data assets. With the data assets, data services can be expanded quickly and conveniently. For example, data services can be operational analysis and display results with visual reports, or data analysis in which potential laws and phenomena in the data may be found through algorithms such as rule and algorithms, classification algorithms, and clustering to discover new knowledge.

What needs to be further explained here is that the tables of the DWD layer data warehouse are divided into the fact table and the dimension table. The update process of the incremental data of the fact table is as follows. If there is update in the source data in the ODS layer, that is, the update time of the update time field in the data table is the timestamp of the day when the task of pulling and storing data into the big data platform is executed, a new piece of data is added to the fact table, and the piece of fact data in the corresponding table of the ODS layer is added to the fact table. The update process of the dimension table is as follows. The dimension table is to update the attribute corresponding to the existing entity values, and for a new entity value, a new piece of data is added and stored in the dimension table.

In addition, the current ODS/DWD/DWS layer data is stored in Hive. The DWD/DWS data warehouse is implemented in Hive using SQL calculations. The calculation task is a daily scheduled task, which is set to start at 6:00 a.m. every day, for example. The data warehouse construction process of the real-time data stream of the Internet of Things platform is consistent with the system data warehouse construction process, and there is an additional data cleaning task. The data cleaning task uses the Spark framework for batch processing, which is also a timed task once a day and is set to start at 5:00 a.m. in the morning every day.

In step S130, the fact table is stored in a columnar database, and the target column data required for generating the target chart is obtained from the columnar database.

Specifically, after the transaction fact table and the periodic snapshot fact table are obtained, they can be stored in a columnar database (ClickHouse, or HBase) to provide fast data query for data services. Further, the DWD/DWS layer tables used in report making in Hive are transferred to the columnar database ClickHouse, and the database connected to the business intelligence tool for making reports is ClickHouse. The data synchronization task of transferring Hive table data to ClickHouse is also a timed task, which is set to start at 7:00 a.m. every morning, for example. The Jar package that realizes data synchronization is reusable by multiple data sources, and the task of multi-table synchronization can be realized by modifying the configuration file.

In step S140, the target chart is generated according to the target column data.

In an exemplary embodiment, the target chart can be generated based on the pulled target column data by a business intelligent tool. Then, according to the target chart, the operation status of the terminal device and the application system included in the target chart is analyzed. For example, the following analysis may be included: analyzing the amount of usage for users to use the terminal device corresponding to the application system according to the target chart; or analyzing playback amount of video data generated by the application system on the terminal device according to the target chart; or analyzing the online status of the application system and the terminal device.

Of course, according to the analysis result of the users' usage quantity of the terminal device corresponding to the application system, the users' usage quantity of the terminal device in a future period of time may be predicted, and the usage quantity of the terminal device in the regions where the users are located in the future time period may be predicted.

For example, the purchase situation of a certain company on one or more terminal devices may be analyzed according to the target chart, or the playback situation of certain advertisements or videos on the terminal device may be analyzed according to the target chart, or the number of online or offline times of a certain terminal device within a certain period of time may be analyzed so as to analyze whether the terminal device is offline, or the use of the application system by a user may be analyzed to determines key users that need attention according to the analysis results. Of course, the usage quantity of a terminal device may be predicted so as to determine the number of terminal devices to be produced, and so on.

Of course, data query services, data prediction services, user portraits, recommendation services, or the link can be implemented according to the target chart, and data services can be expanded according to business needs. Data services are universal. For different source data of different businesses, after the construction of data assets, existing data services can be directly applied. This saves a lot of developer's workload, realizes data feedback business, provides guidance for business optimization, provides suggestions for company decision-making, and can quickly promote the production of new business and product services.

Figure 10:
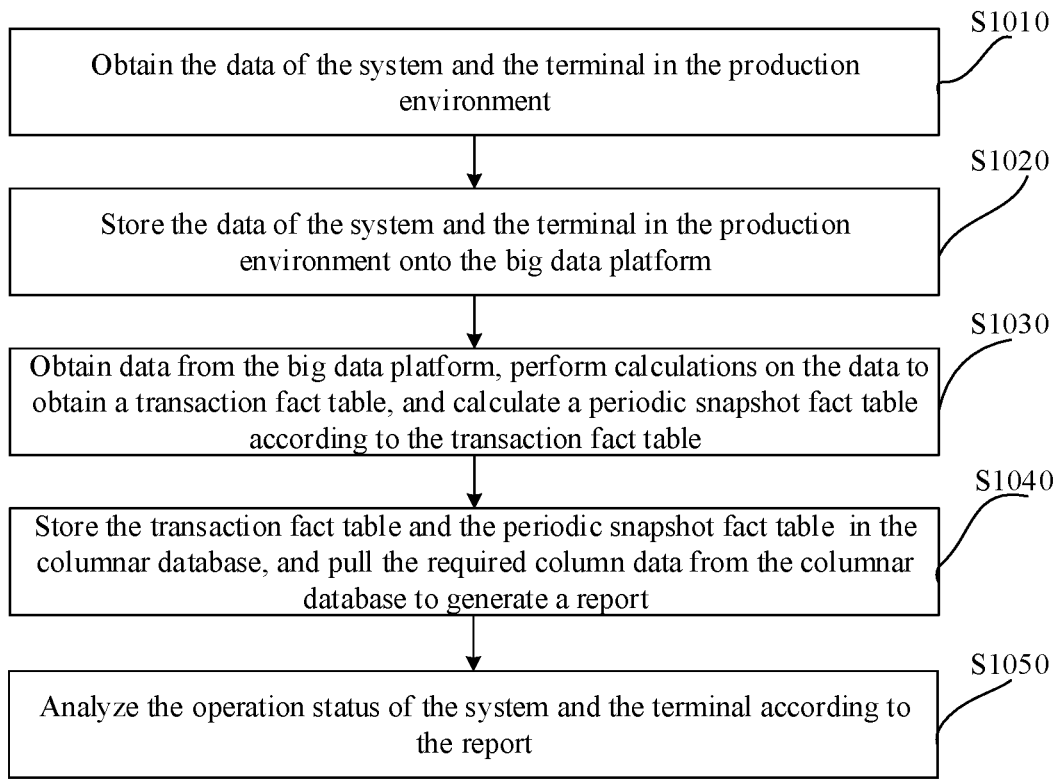
FIG. 10 schematically shows a flowchart of another data processing method according to an exemplary embodiment of the present disclosure.

Hereinafter, taking a real information distribution service as an example, the specific implementation process of the data processing method according to embodiments of the present disclosure will be explained and described. The information distribution business includes an information publishing system and a terminal. The information publishing system is composed of a server, a network, a player, and a display device. The server information is sent to the player through the network (wide area network/local area network/ private network, including wireless network), and the player combines audio, video, pictures, text and other information (including playback location and playback contents, etc.) and converts the combined information to audio and video input form that can be received by the display device such as a liquid crystal television to play audio and video files. In this way, all server information can be sent to the terminal through the network. The terminal, i.e., the display device, includes super-sized terminal (98 inches/110 inches), painted screen terminal, Smart device Tech box, and so on. Specifically, referring to FIG. 10, the data processing method may include the following steps:

In step S1010, the data of the system and the terminal in the production environment is obtained. Specifically, the database of the information publishing system is MySQL, which is deployed in the cloud. The customer's system operation data and system contents (materials/programs/ plans) are all stored in the database. The terminal data is collected in real time through the IoT platform, including the terminal's device state behavior (heartbeat data, etc.), command log data (command results are divided into three categories: info/warn/error), and hardware product data (including the latitude and longitude data of the terminal, temperature, etc.). The data center uses the batch integrated extraction-transformation-loading tool, and adopts the method of actively pulling data to obtain the data of the system. The implementation method is to use the Flink framework combined with the docker image technology to pull the full amount of data in the MySQL database on a daily basis by a docker image of Flink. The cloud mysql database in the production environment only needs to provide a readable account, and the full amount of data in the My SQL database is pulled every day, which does not create pressure on the production environment. The data pulled by Flink's docker image is sent to the Kafka cluster. The Kafka cluster needs to set a corresponding topic in advance, for example, the topic name is xinfa-ab-MySQL. The terminal data is collected in real time, and the terminal data is obtained by pushing. After the IoT platform collects the real-time data stream of the terminal in real time, the IoT platform pushes the data to the data receiving interface. After the data receiving interface obtains the data, the data receiving interface transmits the data to the Kafka cluster in real time under a topic. The topic needs to be set in advance, for example, the name of topic is iot-ab-api.

In step S1020, the data of the system and the terminal in the production environment is stored on the big data platform. Specifically, multiple Flink docker images are used to store the data under the topic in the Kafka cluster into HDFS, with the business as the general catalog and the day as the partition for storage. The information distribution system uses a relational database, such as a MySQL relational database. After the data is pulled, a row of data is converted into a json string. The json string is a one-dimensional string. The data on the topic in Kafka can be read and saved into HDFS. The IoT platform itself is designed with multiple topics, and the format of each topic is different. There are one-dimensional j son string format and multi-dimensional nested format data. The data sources of multiple topics of the IoT platform are transferred to the Kafka cluster under the same topic. When reading the source data of the IoT platform on the Kafka cluster, data cleaning is required to flatten the json string in the multi-dimensional nested format into a one-dimensional json string, and then to store the json string at the HDFS storage location with the business as the general catalog and day as the partition. The task of pulling data and storing data to the big data platform is set as a daily scheduled task, which will be started on 23:00 every night. Under normal circumstances, the task will definitely be completed before 24:00 o'clock.

In step S1030, data is obtained from the big data platform, calculations are performed on the data to obtain a transaction fact table, and a periodic snapshot fact table is calculated according to the transaction fact table. The specific calculation process is consistent with the foregoing embodiments, and will not be repeated here.

In step S1040, the transaction fact table and the periodic snapshot fact table are stored in the columnar database, and the required column data is pulled from the columnar database to generate a report.

In step S1050, the operation status of the system and the terminal is analyzed according to the report.

The data processing method according to embodiments of the present disclosure has at least the following advantages:

On the one hand, the data is stored and managed in a unified format. The planned and collected data is in a unified format with clear meaning, which is convenient for management and task calling. Data development realizes batch computing and streaming computing to meet the needs of offline tasks and real-time computing. The data assets aggregate product data of various businesses. The data warehouse is constructed hierarchically and a data mart is constructed by topic domains, which can fully support various data services, realize data feedback business, provide business guidance, and optimize business.

On the other hand, because the data aggregation is realized by the message engine, the purpose of traffic peak reduction can be achieved, and the message engine can play the role of a data transmission channel. Also, because the data storage realizes the persistent storage of real-time data and offline data, this can satisfy historical data back calculation or supplement of data. Data development includes batch computing and streaming computing. The batch computing is suitable for high-latency processing scenarios for batch data. The streaming computing is s suitable for scenarios where high timeliness requirements are imposed on processing and application of corresponding data.

On the other hand, the present disclosure implements a method for constructing the overall architecture of a data center that supports software and hardware products. First, the present disclosure provides an interface method that can realize the collection of offline data sources or real-time data streams of software and hardware. Then, the message engine realizes the temporary storage of the collected data. The data temporarily stored by the message engine is then stored persistently, including data backup and data recovery functions. The data used by the data services is stored in a columnar database to ensure fast data query speed and support PB-level data volume. Data development can realize batch computing and streaming computing, and the present disclosure supports batch processing after data accumulation, and also supports streaming computing where data is processed once the data arrives to meet the needs of low-latency processing of data. On the basis of the constructed data assets, the present disclosure can be Provide various data services, realize data feedback business, optimize business needs, and provide more empowerment to businesses.

Further, the present disclosure realizes the acquisition of source data on various hardware and software in enterprises, and can realize persistent storage, to meet the needs of historical data back calculation and data supplement. Then, the overall data assets of the enterprise businesses are obtained through data development to form unified data management process. The present disclosure supports business optimization and business innovation, including improving efficiency, saving manpower, reducing costs, and improving asset utilization. Business innovation includes for example digital product innovation, digital asset sales, and digital ecological businesses. Digital product innovation is to discover new business value through data, thereby realizing the incubation of new digital products. The digital asset sales is to combine, package, analyze, and desensitize accumulated data to form data assets that are valuable to some users, such as industry reports or high-quality content, and these assets can generate revenue through direct sales.

The digital ecological businesses refers to helping companies build their own digital ecosystem by opening up the industrial supply chains, thereby generating new business value and income in the ecosystem.

Figure 11:
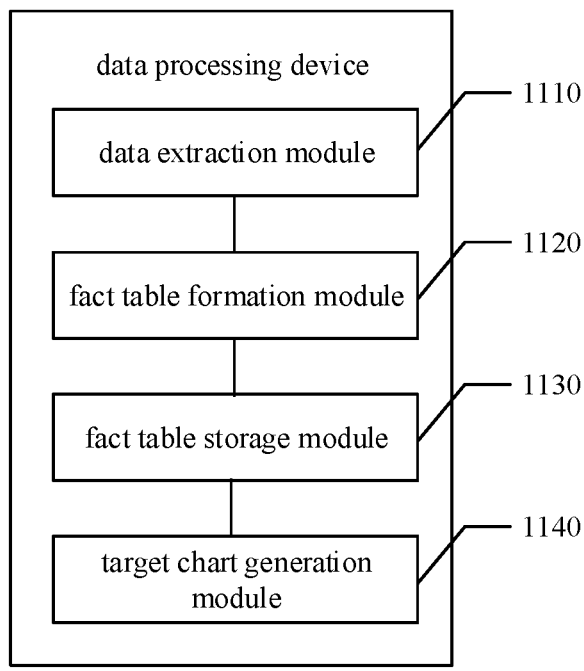
FIG. 11 schematically shows a block diagram of a data processing device according to an exemplary embodiment of the present disclosure.

An embodiment of the present disclosure further provides a data processing device. Referring to FIG. 11, the data processing device may include a data extraction module 1110, a fact table formation module 1120, a fact table storage module 1130 and a target chart generation module 1140.

The data extraction module 1110 is configured to extract original data into a message engine based on a preset standardized data interface. The original data includes terminal data generated by a terminal device and/or system data generated by an application system.

The fact table formation module 1120 is configured to read the original data from the message engine, and store the original data in a distributed file system to form a fact table.

The fact table storage module 1130 is configured to store the fact table in a columnar database, and obtain target column data required for generating a target chart from the columnar database.

The target chart generation module 1140 is configured to generate the target chart according to the target column data.

According to an exemplary embodiment of the present disclosure, extracting the original data into the message engine based on the preset standardized data interface includes:
  based on the preset standardized data interface, receiving the terminal data pushed by a platform where the terminal device is located, wherein the terminal data includes one or more of device state behavior of the terminal device, command log data, and hardware product data; and
  based on a batch integration tool and the preset standardized data interface, pulling the system data from a relational database at an interval of a first preset time period; and
  aggregating the terminal data and/or the system data into the message engine.

According to an exemplary embodiment of the present disclosure, aggregating the terminal data and/or the system data into the message engine includes:
  according to a data event type of the system data and/or the terminal data, aggregating the terminal data and/or the system data under a topic in the message engine which corresponds to the data event type.

According to an exemplary embodiment of the present disclosure, the fact table includes a transaction fact table;
  wherein reading the original data from the message engine, and storing the original data in the distributed file system to form the fact table includes:
  reading the original data from the message engine, and according to a data generation timestamp of the original data, storing the original data in the distributed file system under a date corresponding to the data generation timestamp;
  reading the original data from the distributed file system, and constructing an original data layer according to the original data;
  calculating a topic domain of the original data according to the original data included in the original data layer and a data dictionary corresponding to the original data; and
  summarizing the original data according to the topic domain to generate the transaction fact table.

According to an exemplary embodiment of the present disclosure, reading the original data from the distributed file system, and constructing the original data layer according to the original data includes:

creating an original data table including a data source, a data reporter, a data version number, a data sending location, a data generation timestamp, a data event type, and data details;

reading the original data according to a storage location of the original data in the distributed file system; and according to a current date corresponding to the data generation timestamp of the original data, writing the original data into the original data table at a location corresponding to the current date to obtain the original data layer.

According to an exemplary embodiment of the present disclosure, calculating the topic domain of the original data according to the original data included in the original data layer and the data dictionary corresponding to the original data includes:

obtaining the data dictionary corresponding to the original data, and determining a data service corresponding to the original data according to the data dictionary; and determining the topic domain of the original data according to the data service, wherein the topic domain includes one or more of a terminal domain, a system domain, and a user domain.

According to an exemplary embodiment of the present disclosure, obtaining the data dictionary corresponding to the original data includes:

when the original data is the system data, pulling metadata corresponding to the original data as the data dictionary; and when the original data is the terminal data, creating the data dictionary according to a catalog included in the metadata.

According to an exemplary embodiment of the present disclosure, summarizing the original data according to the topic domain to generate the transaction fact table includes:

when the original data is the terminal data, summarizing the original data into a report whose topic domain is the terminal domain, and generating the transaction fact table corresponding to the terminal domain; and when the original data is the system data, summarizing the original data into a report whose topic domain is the system domain, and generating the transaction fact table corresponding to the system domain.

According to an exemplary embodiment of the present disclosure, the fact table further includes a periodic snapshot fact table;

wherein the data processing device further includes:

a periodic snapshot fact table generation module configured to aggregate the transaction fact table based on a preset aggregation rule to obtain the periodic snapshot fact table;

wherein the preset aggregation rule includes aggregation at a preset time interval.

According to an exemplary embodiment of the present disclosure, aggregating the transaction fact table based on the preset aggregation rule to obtain the periodic snapshot fact table includes:

generating an attribute dimension table according to attribute information of the terminal device included in the terminal data and attribute information of the application system included in the system data;

establishing an association relationship between a transaction fact table corresponding to the terminal domain and a transaction fact table corresponding to the system domain according to common attributes between the terminal device and the application system included in the attribute dimension table; and based on the association relationship, aggregating the transaction fact table corresponding to the terminal domain and the transaction fact table corresponding to the system domain at the preset time interval to obtain the periodic snapshot fact table.

The specific details of each module in the data processing device have been described in detail in the corresponding data processing method, and therefore repeated descriptions will be omitted here.

It should be noted that although several modules or units of the devices for action execution are described above, such division is not mandatory. In fact, according to the embodiments of the present disclosure, the features, and functions of two or more modules or units described above may be embodied in one module or unit. Conversely, the features and functions of a module or unit described above can be further divided into multiple modules or units.

Furthermore, although various steps of the methods of the present disclosure are described in a particular order in the drawings, this does not imply that the steps must be performed in that particular order or that all of the steps shown must be performed to achieve a desired result. Additionally or alternatively, certain steps may be omitted, multiple steps may be combined into one step, and/or one step may be split into multiple steps, and so on.

An exemplary embodiment of the present disclosure also provides an electronic device capable of implementing the above methods.

Those skilled in the art can understand that various aspects of the present disclosure may be implemented as a system, method, or program product. Therefore, various aspects of the present disclosure can be embodied in the following forms: a complete hardware implementation, a complete software implementation (including firmware, microcode, etc.), or a combination of hardware and software, which can be collectively referred to as "circuit", "module', or "system".

An electronic device according to an exemplary embodiment of the present disclosure is described below with reference to FIG. 12. The electronic device 4500 shown in FIG. 12 is only an example, and should not impose any limitation on the functions and scope of use of the embodiments of the present disclosure.

Figure 12:
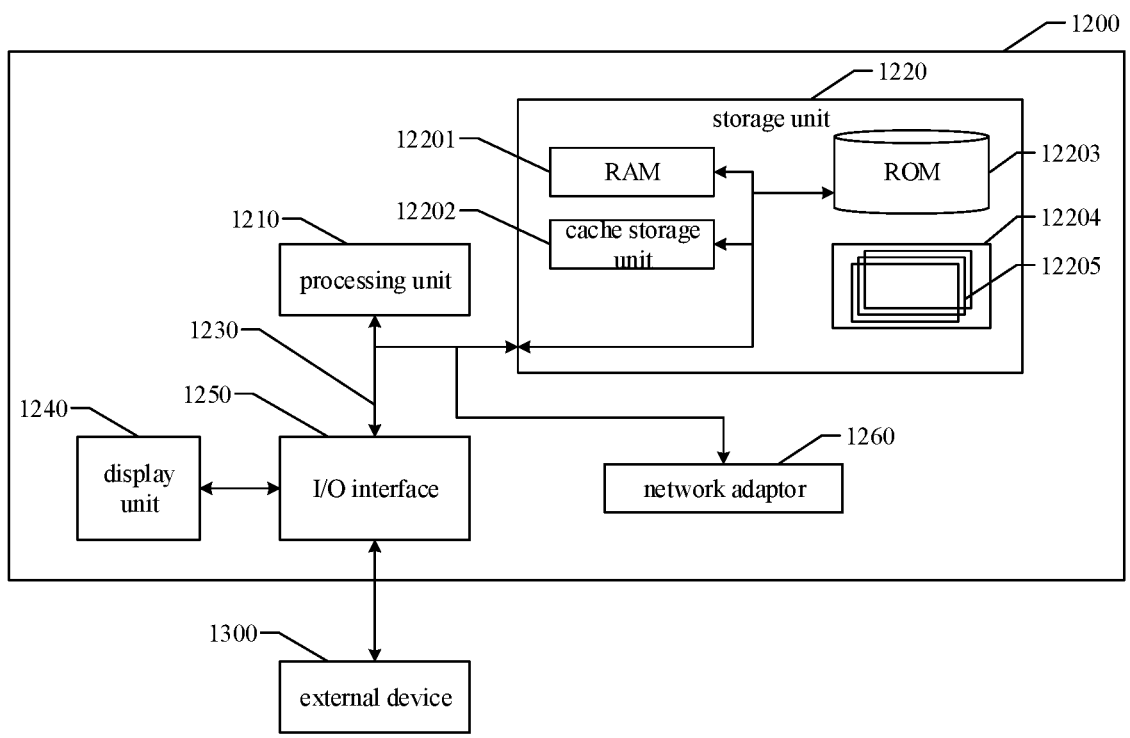
FIG. 12 schematically shows an electronic device for implementing the above-mentioned data processing method according to an exemplary embodiment of the present disclosure.

As shown in FIG. 12, the electronic device 1200 is shown in the form of a general-purpose computing device. The components of the electronic device 1200 may include, but are not limited to, at least one processing unit 1210, at least one storage unit 1220, and a bus 1230 connecting different system components (including the storage unit 1220 and the processing unit 1210) and a display unit 1240.

The storage unit stores program codes, and the program codes can be executed by the processing unit 1210, so that the processing unit 1210 executes various exemplary embodiments according to the present disclosure described in the "exemplary methods" section of the present specification. For example, the processing unit 1210 may perform the steps shown in FIG. 1. In step S110, original data is extracted into a message engine based on a preset standardized data interface. The original data includes terminal data generated by a terminal device and/or system data generated by an application system. In step S120, the original data is read from the message engine, and the original data is stored in a distributed file system to form a fact table. In step S130, the fact table is stored in a columnar database, and target column data required for generating a target chart is obtained from the columnar database. In step S130, the target chart is generated according to the target column data.

The storage unit 1220 may include a readable medium in the form of a volatile storage unit, such as a random access storage unit (RAM) 12201 and/or a cache storage unit 12202, and may further include a read-only storage unit (ROM) 12203.

The storage unit 1220 may further include a program/utility tool 12204 having a set (at least one) of program modules 12205. Such program modules 12205 include, but are not limited to, an operating system, one or more application programs, other program modules, and program data. Each or some combination of these examples may include an implementation of a network environment.

The bus 1230 may be one or more of several types of bus structures, including a memory unit bus or a memory unit controller, a peripheral bus, a graphics acceleration port, a processing unit, or a local area bus using any bus structure in a variety of bus structures.

The electronic device 1200 may also communicate with one or more external devices 1300 (such as a keyboard, a pointing device, a Bluetooth device, etc.), and may also communicate with one or more devices that enable a user to interact with the electronic device 1200, and/or may also communicate with any device (such as a router, a modem) that can enable the electronic device 1200 to interact with one or more other computing devices. Such communication can be performed through an input/output (I/O) interface 1250. Moreover, the electronic device 1200 may also communicate with one or more networks (such as a local area network (LAN), a wide area network (WAN), and/or a public network, such as the Internet) through the network adapter 1260. As shown in the figure, the network adapter 1260 communicates with other modules of the electronic device 1200 through the bus 1230. It should be understood that although not shown in the figure, other hardware and/or software modules may be used in conjunction with the electronic device 1200, including but not limited to: microcode, device drivers, redundant processing units, external disk drive arrays, RAID systems, tape drives and data backup storage systems.

Through the description of the foregoing embodiments, those skilled in the art can easily understand that the example embodiments described herein can be implemented by software, or by software in combination with necessary hardware. Therefore, the technical solutions according to the embodiments of the present disclosure may be embodied in the form of a software product, and the software product may be stored in a non-volatile storage medium (which may be a CD-ROM, a U disk, a mobile hard disk, etc.) or on a network. The software product may include instructions to cause a computing device (which may be a personal computer, a server, a terminal device, or a network device, etc.) to execute the methods according to exemplary embodiments of the present disclosure.

An exemplary embodiment of the present disclosure also provides a computer-readable storage medium having stored thereon a program product capable of implementing the above methods according to embodiments of the present disclosure. In some possible implementations, aspects of the present disclosure may also be implemented in the form of a program product, which includes program codes. When the program product is run on a terminal device, the program codes are used to cause the terminal device to perform the steps according to various exemplary embodiments of the present disclosure described in the above-mentioned exemplary methods.

A program product for implementing the above methods according to an exemplary embodiment of the present disclosure may be stored by a portable compact disc read-only memory (CD-ROM) and include program codes, and may be executed on a terminal device, such as a personal computer. However, the program product of the present disclosure is not limited thereto. The readable storage medium may be any tangible medium containing or storing a program, and the program may be used by an instruction execution system, apparatus, or device, or the program may be used in combination with an instruction execution system, apparatus, or device.

The program product may employ any combination of one or more readable mediums. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive examples) of readable storage media include: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may include a data signal in baseband or propagated as part of a carrier wave, which carries readable program codes. Such a propagated data signal may have many forms, including but not limited to electromagnetic signals, optical signals, or any suitable combination of the foregoing. The readable signal medium may also be any readable medium other than a readable storage medium, and the readable medium may send, propagate, or transmit a program that is used by an instruction execution system, apparatus, or device, or that is used in combination with an instruction execution system, apparatus, or device.

The program codes contained on the readable medium may be transmitted using any appropriate medium, including but not limited to wireless, wired, optical fiber, RF, etc., or any suitable combination of the foregoing.

The program codes for performing the operations of the present disclosure can be written in any combination of one or more programming languages, which include object-oriented programming languages, such as Java, C++, and so on. The programming languages also include conventional procedural programming language, such as "C" or a similar programming language. The program codes can be executed entirely on the user computing device, can be executed partly on the user device, can be executed as an independent software package, can be executed partly on the user computing device and partly on a remote computing device, or can be executed entirely on the remote computing device or server. In the case of a remote computing device, the remote computing device can be connected to the user computing device through any kind of network, including a local area network (LAN) or a wide area network (WAN), or the remote computing device can be connected to an external computing device, for example, by the Internet provided by the Internet service providers.

In addition, the drawings are merely schematic descriptions of processes included in the methods according to exemplary embodiments of the present disclosure, and are not for limiting the present disclosure. It is easy to understand that the processes shown in the drawings do not indicate or limit the chronological order of these processes. In addition, it is also easy to understand that these processes may be performed synchronously or asynchronously in multiple modules, for example.

Those skilled in the art will readily contemplate other embodiments of the present disclosure after considering the specification and practicing the disclosure. The present disclosure is intended to cover any variations, uses, or adaptive changes of the present disclosure. These variations, uses, or adaptive changes follow the general principles of the present disclosure and include the common general knowledge or conventional technical means in this art which is not described herein. The specification and examples should be considered as exemplary only, and the true scope and spirit of the disclosure should be defined by the appended claims.

What is claimed is:

1. A data processing method, comprising:
    extracting original data into a message engine based on a preset standardized data interface, wherein the original data comprises terminal data generated by a terminal device and system data generated by an application system, and attribute information included in the standardized data interface comprising a data source, a data reporter, a data version number, a data sending location, a data generation timestamp, a data event type, and data details;
    reading the original data from the message engine, and storing the original data in a distributed file system to form a fact table;
    storing the fact table in a columnar database, and obtaining target column data required for generating a target chart from the columnar database; and
    generating the target chart according to the target column data;
    wherein extracting the original data into the message engine based on the preset standardized data interface comprises:
    based on the preset standardized data interface, receiving the terminal data pushed by a platform where the terminal device is located, wherein the terminal data comprises one or more of device state behavior of the terminal device, command log data, and hardware product data, and the terminal data is processed by the preset standardized data interface to comprise a data source, a data reporter, a data version number, a data sending location, a data generation timestamp, a data event type, and data details; and
    based on a batch integration tool and the preset standardized data interface, pulling the system data from a relational database at an interval of a first preset time period, wherein the system data is processed by the preset standardized data interface to comprise a data source, a data reporter, a data version number, a data sending location a data generation timestamp, a data event type, and data details; and
    aggregating at least one of the terminal data and the system data into the message engine.

2. The data processing method according to claim 1, wherein aggregating at least one of the terminal data and the system data into the message engine comprises:
    according to a data event type of at least one of the system data and the terminal data, aggregating at least one of the terminal data and the system data under a topic in the message engine which corresponds to the data event type.

3. The data processing method according to claim 1, wherein the fact table comprises a transaction fact table; and
    wherein reading the original data from the message engine, and storing the original data in the distributed file system to form the fact table comprises:
    reading the original data from the message engine, and according to a data generation timestamp of the original data, storing the original data in the distributed file system under a date corresponding to the data generation timestamp;
    reading the original data from the distributed file system, and constructing an original data layer according to the original data;
    calculating a topic domain of the original data according to the original data comprised in the original data layer and a data dictionary corresponding to the original data; and
    summarizing the original data according to the topic domain to generate the transaction fact table.

4. The data processing method according to claim 3, wherein reading the original data from the distributed file system, and constructing the original data layer according to the original data comprises:
    creating an original data table comprising a data source, a data reporter, a data version number, a data sending location, a data generation timestamp, a data event type, and data details;
    reading the original data according to a storage location of the original data in the distributed file system; and
    according to a current date corresponding to the data generation timestamp of the original data, writing the original data into the original data table at a location corresponding to the current date to obtain the original data layer.

5. The data processing method according to claim 4, wherein calculating the topic domain of the original data according to the original data comprised in the original data layer and the data dictionary corresponding to the original data comprises:
    obtaining the data dictionary corresponding to the original data, and determining a data business corresponding to the original data according to the data dictionary; and
    determining the topic domain of the original data according to the data business, wherein the topic domain comprises one or more of a terminal domain, a system domain, and a user domain.

6. The data processing method according to claim 5, wherein obtaining the data dictionary corresponding to the original data comprises:
    when the original data is the system data, pulling metadata corresponding to the original data as the data dictionary; and
    when the original data is the terminal data, creating the data dictionary according to a catalog comprised in the metadata.

7. The data processing method according to claim 6, wherein summarizing the original data according to the topic domain to generate the transaction fact table comprises:
    when the original data is the terminal data, summarizing the original data into a report whose topic domain is the terminal domain, and generating the transaction fact table corresponding to the terminal domain; and
    when the original data is the system data, summarizing the original data into a report whose topic domain is the system domain, and generating the transaction fact table corresponding to the system domain.

8. The data processing method according to claim 7, wherein the fact table further comprises a periodic snapshot fact table and the data processing method further comprises:
aggregating the transaction fact table based on a preset aggregation rule to obtain the periodic snapshot fact table, wherein the preset aggregation rule comprises aggregation at a preset time interval.

9. The data processing method according to claim 8, wherein aggregating the transaction fact table based on the preset aggregation rule to obtain the periodic snapshot fact table comprises:
generating an attribute dimension table according to attribute information of the terminal device comprised in the terminal data and attribute information of the application system comprised in the system data;
establishing an association relationship between a transaction fact table corresponding to the terminal domain and a transaction fact table corresponding to the system domain according to common attributes between the terminal device and the application system comprised in the attribute dimension table; and
based on the association relationship, aggregating the transaction fact table corresponding to the terminal domain and the transaction fact table corresponding to the system domain at the preset time interval to obtain the periodic snapshot fact table.

10. A data processing platform, comprising:
a data aggregation layer configured to extract original data to a message engine based on a preset standardized data interface, wherein the original data comprises terminal data generated by a terminal device and system data generated by an application system, and attribute information included in the standardized data interface comprising a data source, a data reporter, a data version number, a data sending location, a data generation timestamp, a data event type, and data detail;
a data storage layer connected to the data aggregation layer and configured to read the original data from the message engine and store the original data in a distributed file system; and
a data processing layer connected to the data storage layer and configured to:
read the original data from the distributed file system, and generate a fact table based on the original data; and
store the fact table in a columnar database, and obtain target column data required for generating a target chart from the columnar database; and
generate the target chart according to the target column data;
wherein extracting the original data into the message engine based on the preset standardized data interface comprises:
based on the preset standardized data interface, receiving the terminal data pushed by a platform where the terminal device is located, wherein the terminal data comprises one or more of device state behavior of the terminal device, command log data, and hardware product data, and the terminal data is processed by the preset standardized data interface to comprise a data source, a data reporter, a data version number, a data sending location, a data generation timestamp, a data event type, and data details; and
based on a batch integration tool and the preset standardized data interface, pulling the system data from a relational database at an interval of a first preset time period, wherein the system data is processed by the preset standardized data interface to comprise a data source, a data reporter, a data version number, a data sending location, a data generation timestamp, a data event type, and data details; and
aggregating at least one of the terminal data and the system data into the message engine.

11. The computer program product according to claim 10, wherein:
the data processing layer comprises an original data layer, a unified data warehouse layer, an application data layer, a tag data layer, and a dimension table;
the unified data warehouse layer is connected to the original data layer, the application data layer and the tag data layer are connected to the unified data warehouse layer, and the dimension table is comprised in the unified data warehouse layer;
the original data layer is configured to read the original data from a file storage system and store the original data,
the unified data warehouse layer is configured to:
calculate a topic domain of the original data according to the original data comprised in the original data layer and a data dictionary corresponding to the original data; and
summarize the original data according to the topic domain to generate a transaction fact table; and
generate an attribute dimension table according to attribute information of terminal device comprised in terminal data comprised in the original data and attribute information of an application system comprised in system data comprised in the original data;
generate a periodic snapshot fact table according to the transaction fact table and the attribute dimension table;
the application data layer is configured to obtain target column data required for generating a target chart from the column database, and generate the target chart according to the target column data; and
the tag data layer is configured to identify the terminal device and the application system comprised in the original data.

12. An electronic device, comprising:
at least one hardware processor; and
a memory storing program instructions executable by the at least one hardware processor that, when executed, direct the at least one hardware processor to:
extract original data into a message engine based on a preset standardized data interface, wherein the original data comprises terminal data generated by a terminal device and system data generated by an application system, and attribute information included in the standardized data interface comprising a data source, a data reporter, a data version number, a data sending location, a data generation timestamp, a data event type, and data details;
read the original data from the message engine, and store the original data in a distributed file system to form a fact table;
store the fact table in a columnar database, and obtain target column data required for generating a target chart from the columnar database; and
generate the target chart according to the target column data;

wherein extracting the original data into the message engine based on the preset standardized data interface comprises:
- based on the preset standardized data interface, receiving the terminal data pushed by a platform where the terminal device is located, wherein the terminal data comprises one or more of device state behavior of the terminal device, command log data, and hardware product data, and the terminal data is processed by the preset standardized data interface to comprise a data source, a data reporter, a data version number, a data sending location, a data generation timestamp, a data event type, and data details; and
- based on a batch integration tool and the preset standardized data interface, pulling the system data from a relational database at an interval of a first preset time period, wherein the system data is processed by the preset standardized data interface to comprise a data source, a data reporter, a data version number, a data sending location a data generation timestamp a data event type, and data details; and
- aggregating at least one of the terminal data and the system data into the message engine.

13. The electronic device according to claim 12, wherein the at least one hardware processor is further directed to:
- according to a data event type of at least one of the system data and the terminal data, aggregate at least one of the terminal data and the system data under a topic in the message engine which corresponds to the data event type.

14. The electronic device according to claim 12, wherein the fact table comprises a transaction fact table, and the at least one hardware processor is further directed to:
- read the original data from the message engine, and according to a data generation timestamp of the original data, store the original data in the distributed file system under a date corresponding to the data generation timestamp;
- read the original data from the distributed file system, and construct an original data layer according to the original data;
- calculate a topic domain of the original data according to the original data comprised in the original data layer and a data dictionary corresponding to the original data; and
- summarize the original data according to the topic domain to generate the transaction fact table.

15. The electronic device according to claim 14, wherein the at least one hardware processor is further directed to:
- create an original data table comprising a data source, a data reporter, a data version number, a data sending location, a data generation timestamp, a data event type, and data details;
- read the original data according to a storage location of the original data in the distributed file system; and
- according to a current date corresponding to the data generation timestamp of the original data, write the original data into the original data table at a location corresponding to the current date to obtain the original data layer.

16. The electronic device according to claim 15, wherein the at least one hardware processor is further directed to:
- obtain the data dictionary corresponding to the original data, and determine a data business corresponding to the original data according to the data dictionary; and
- determine the topic domain of the original data according to the data business, wherein the topic domain comprises one or more of a terminal domain, a system domain, and a user domain.

17. The electronic device according to claim 16, wherein the at least one hardware processor is further directed to:
- when the original data is the system data, pull metadata corresponding to the original data as the data dictionary; and
- when the original data is the terminal data, create the data dictionary according to a catalog comprised in the metadata.

* * * * *